United States Patent [19]

Pollin

[11] Patent Number: 4,557,143

[45] Date of Patent: Dec. 10, 1985

[54] LAUNCH SETBACK SIMULATOR

[76] Inventor: Irvin Pollin, 6600 Michaels Dr., Bethesda, Md. 20817

[21] Appl. No.: 553,273

[22] Filed: Nov. 18, 1983

[51] Int. Cl.⁴ .......................... G01L 5/14; G01M 7/00

[52] U.S. Cl. .......................................... 73/167; 73/12; 73/432 SD

[58] Field of Search .............................. 73/167, 12, 11

[56] References Cited

U.S. PATENT DOCUMENTS

| | | | |
|---|---|---|---|
| 3,552,525 | 1/1971 | Schudel | 73/12 X |
| 3,940,981 | 3/1976 | Covey et al. | 73/167 |
| 4,010,631 | 3/1977 | Pollin | 73/167 |
| 4,300,389 | 11/1981 | Tevelow | 73/167 |

FOREIGN PATENT DOCUMENTS

| | | | |
|---|---|---|---|
| 0316195 | 2/1918 | Fed. Rep. of Germany | 73/167 |

OTHER PUBLICATIONS

"Application of Laser Techniques in Rain Impact, etc.", D. J. Novak, Optical Engineering (3-4/1979, vol. 18, No. 2) pp. 173-176.

"Projectiles Fired Into Artifical Rain Reveal Raindrop Damage", Popular Mechanics, p. 144, Aug. 1955.

*Primary Examiner*—Daniel M. Yasich

[57] ABSTRACT

The launch setback experienced by an ordnance projectile is simulated. A field of water droplets of varying density is placed in the path of the projectile. The momentum exchange between the projectile and the water droplets retards the motion of the projectile in a prescribed way to simulate the initial portion of the launch setback. A mitigator is placed downstream from the field of water droplets and in the path of the projectile. The mitigator retards the motion of the projectile in a prescribed way to simulate the remaining portion of the launch setback.

17 Claims, 3 Drawing Figures

HM
CM
VP
P
V
V
72
70
92
82
90
80
38
42
36
40
34
62
32
60
30
20
18
8
14
10
15

70
90
112
108
102
100
106
110
104

RAIN DENSITY VS. PROJ. SPEED

LAUNCH SETBACK SIMULATOR

RIGHTS OF THE GOVERNMENT

The invention described herein may be manufactured and used by or for the U.S. Government for government purposes without the payment to me of any royalty thereon.

BACKGROUND OF THE INVENTION

The present invention relates to the testing of kinetic forces and is concerned, more particularly, with the simulation of acceleration forces on projectiles and their components.

The testing of components for use in projectiles includes simulation of accelerative forces under conditions in which the forces can be accurately measured and modified to reproduce the actual forces and force changes experienced by a projectile in actual service.

For example, the ruggedness and reliability of components, such as those within an artillery fuze, generally cannot be qualitatively, quantitatively, or comparatively evaluated except under conditions which simulate flight experience.

Instead of producing the required conditions by actual flight and the consequent terminal destruction at impact, a preferred method of simulating the forces to be experienced by a projectile and its components has been through the use of an air gun accelerating a projectile to the simulated projectile muzzle speed, and then decelerating the projectile at a controlled rate to simulate the acceleration or launch setback experienced by the projectile in actual use. This deceleration has been accomplished by impacting the projectile against an opposing, deformable velocity mitigator and imparting the momentum of the projectile to a momentum exchange mass.

Examples of deformable velocity mitigators are disclosed in U.S. Pat. No. 4,010,631, issued to Pollin on Mar. 8, 1977, and incorporated by reference herein. The mitigators disclosed in this patent are preferably constructed out of honeycombed or corrugated aluminum.

At present, no laboratory controlled system is capable of providing simulation of the launch setback (acceleration-time pulse) for projectiles whose muzzle speeds exceed about 1500 feet per second. Using aluminum mitigators at speeds above 1500 feet per second presents a number of problems. The mitigators will not crush in cellular columns, nor do they maintain their structural integrity. Also, at very high projectile speeds, they may explode on impact with the projectile. Lastly, the results obtained are not reliable controllable, or reproducible. Thus, for projectile speeds in excess of 1500 feet per second, there is a need for a system which will controllably decelerate the projectile to the speeds for which aluminum mitigitors can be used.

SUMMARY OF THE INVENTION

An apparatus and a method is provided for the laboratory simulation of the launch setback (acceleration-time pulse) experienced by high speed ordnance projectiles. A portion of the launch setback may be simulated, or both the inital and final portions of the setback, or the entire setback can be simulated.

The apparatus to simulate a portion of the launch setback provides a means for accelerating the projectile to a high speed. This may comprise an air gun. A rainfield generator generates a field of water droplets in the path of the projectile, and means are provided for varying the density of the field of water droplets as a function of the travel distance of the projectile. The momentum exchange between the projectile and the water retards the motion of the projectile in a prescribed way resulting in the simulation of a portion of the launch setback.

The apparatus to simulate a portion of the launch setback, or the entire setback experienced by an ordnance projectile, provides a means for accelerating the projectile to a high speed. This may comprise an air gun. A rainfield generator, having a specified length, generates a field of water droplets in the path of the projectile, and means are provided for varying the density of the field of water droplets as a function of the travel distance of the projectile. Guide rails are provided for guiding the projectile through the length of simulated setback. Mitigator means are placed downstream from the field of water droplets and in the path of the projectile to retard the motion of the projectile in a prescribed way. The mitigator means may comprise a crushable mitigator followed by a heavy nondeformable member, called a momentum exchange mass. The momentum exchange between the projectile and the field of water droplets retards the motions of the projectile in a prescribed way resulting in the simulation of the initial portion of the launch setback, and the crushable mitigator means simulates the remaining portion of the launch setback.

The rainfield generator comprises one or more tanks. An individual valve-controlled water supply line is connected to each of the tanks. Each tank has a plurality of adjustable orifices to allow water droplets to exit into the path of the projectile. Means are provided in each of the tanks for covering a portion of the orifices to thereby control the amount of water exiting from the rainfield generator. The means for covering a portion of the orifices may comprise a moveable perforated plate in each of the tanks. Means are also provided for measuring the amount of rain generated by the rain generator, which may comprise a series of rain gauges.

A method is also presented to simulate the launch setback experienced by an ordnance projectile. The projectile is accelerated to a high speed. A field of water droplets is generated in the path of the projectile, with the field having a specified length. The density of the field of water droplets is varied as a function of the travel distance of the projectile. The projectile is guided through the length of simulated setback. After the projectile passes through the field of water droplets, its motion is further retarded in a prescribed way. The momentum exchange between the projectile and the water retards the motion of the projectile in a prescribed way resulting in the simulation of the initial portion of the launch setback, and retarding the motion of the projectile in a prescribed way using a crushable mitigator means simulates the remaining portion of the launch setback.

The above method may also include the step of measuring the amount of water falling in the path of the projectile.

OBJECTS OF THE INVENTION

It is an object of this invention to provide a system for testing high speed ordnance projectiles in the laboratory without their terminal destruction.

It is a further object of this invention to employ a rainfield generator to generate a field of water droplets of varying density in the path of the projectile so that the momentum exchange between the projectile and the field of water retards the motion of the projectile in a prescribed way.

Another object of this invention is to present a system which can simulate a portion of the launch setback experienced by ordnance projectile.

It is still a further object of this invention to present a system which can simulate the initial and final portions of the launch setback, or the entire launch setback experienced by an ordance projectile.

DESCRIPTION OF THE PREFERRED EMBODIMENT

Figure 1:
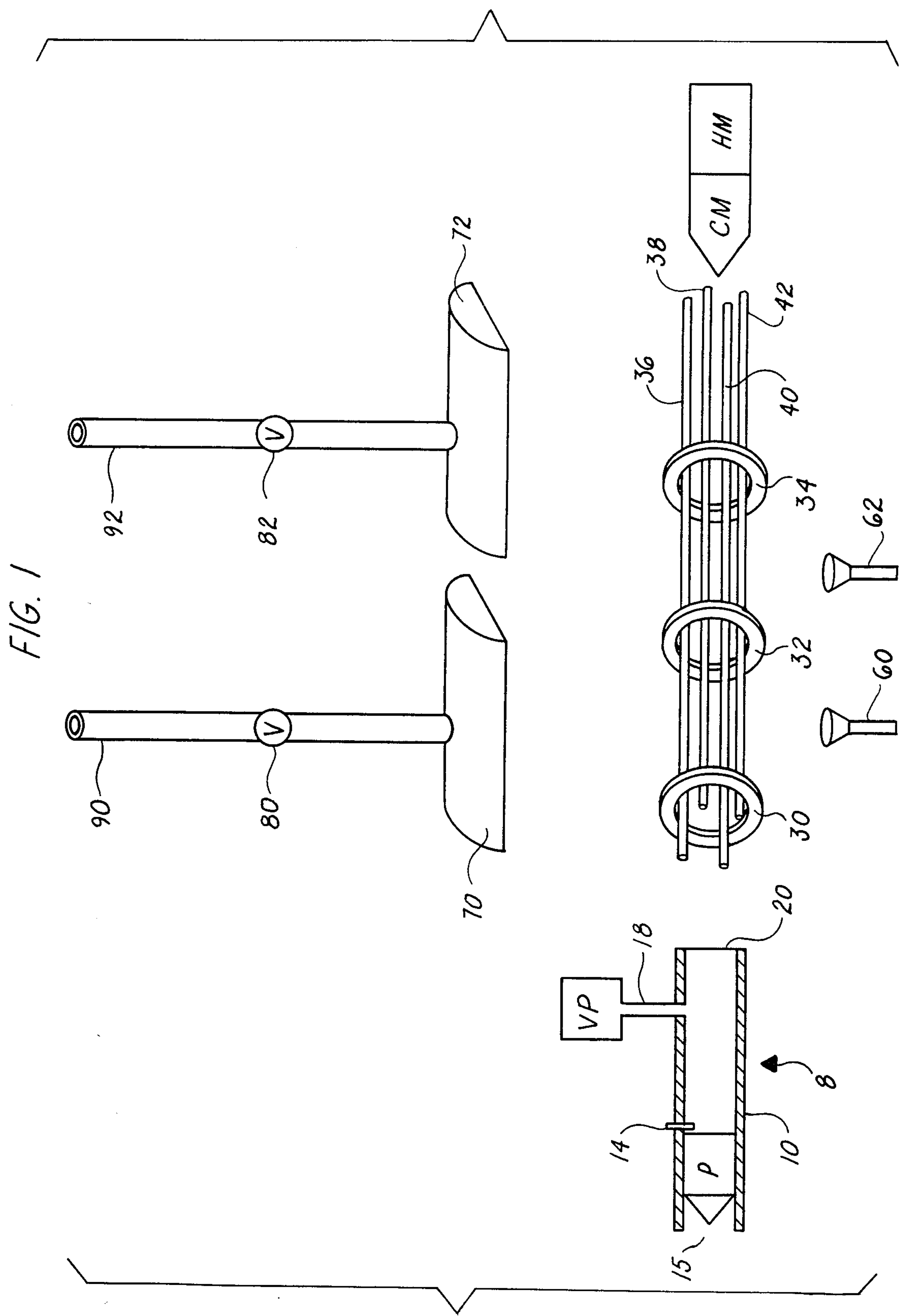
FIG. 1 is a schematic diagram of the launch setback simulator embodying the invention.

The launch setback simulator is shown schematically in FIG. 1. A cross section of the air gun is shown generally at 8. A projectile P, which may contain fuze or other components to be tested, is placed in air gun tube 10. The air gun tube 10 is open to the atmosphere at end 15, and is sealed by a thin rupturable membrane 20 at its other end. The diameter of projectile P is selected so as to give a close fit between it and the bore of air gun tube 10. The projectile P is used to seal air gun tube 10 at its open end 15 against the atmosphere. The seal is accomplished by means of an O-ring, not illustrated, placed between projectile P and the bore of air gun tube 10.

A vacuum pump, VP, is connected to the interior of air gun tube 10 by vacuum line 18. Initially, projectile P is held in place by projectile release pin 14. The vacuum pump, VP, is used to generate a vacuum in air gun tube 10 between the end of projectile P against release pin 14 and the thin, rupturable membrane seal 20. Once a sufficient vacuum is created, projectile release pin 14 is retracted, at which point atmospheric pressure accelerates projectile P toward the membrane seal 20, which is ruptured upon impact with the projectile. In an alternative embodiment, a source of high pressure gas, not illustrated, can be used to drive projectile P instead of using atmospheric pressure. The high pressure gas would enter air gun tube 10 at its open end 15. This is done to generate higher projectile speeds.

Once projectile P ruptures membrane 20 and emerges from the air gun 8, it passes through a field of water droplets, not illustrated, generated by rainfield generators 70 and 72. Water is fed to rain generator 70 from water supply line 90, controlled by valve 80. Water is fed to rain generator 72 from water supply line 92, controlled by valve 82. Although only two rain generators are shown, any number can be used. Guide rails 36, 38, 40, and 42, supported by guide rail support rings 30, 32, and 34, are provided to guide projectile P though the rainfield. A series of rain gauges, of which 60 and 62 are typical illustrations, is also provided for measuring the amount of rain generated. After projectile P emerges from the field of water droplets, it impacts a crushable mitigator, CM, which is backed by a heavy member, HM. The crushable mitigator, CM, is crushed in a controlled manner by the projectile P to thereby simulate the remaining part of the launch setback. The crushable mitigator may be constructed out of honeycombed aluminum. The heavy member, HM, is a large mass of iron, brass, or some other high density material. The heavy member acts to completely stop the projectile as it impacts the crushable mitigator.

Guide rails 36, 38, 40, and 42 have the same length us the rainfield generated by rain generators 70 and 72. The crushable mitigator CM, backed by heavy member HM, is placed directly adjacent to the end of guide rails 36, 38, 40, and 42.

Figure 2:
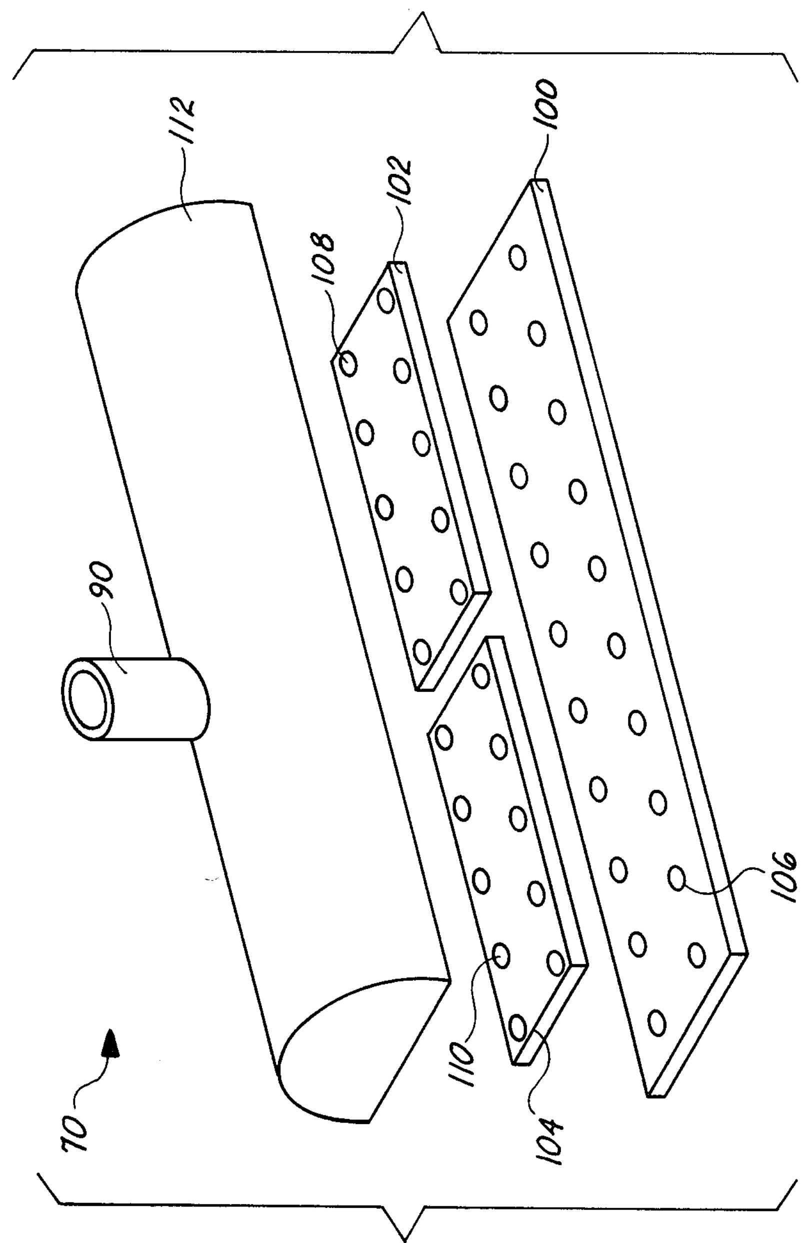
FIG. 2 is a sectional view of a portion of the rainfield generator.

A sectional view of rainfield generator 70 is shown in FIG. 2. The rainfield generator consists of a flat bottom plate 100 connected to a semicircular water tank 112. Water enters the tank from water supply line 90. Bottom plate 100 contains a plurality of orifices 106 whose openings can be adjusted. The adjustable orifices 106 produce the rain droplets. Moveable control plates 102 and 104 are provided inside of the rain generator 70. Although two control plates are shown, any number could be used. The control plates move parallel to plate 100. Control plates 102 and 104 contain a plurality of orifice control holes 108 and 110, respectively. The purpose of control plate 102 and 104 is to selectively cover or uncover orifices 106 to further control the amount of water exiting from the rainfield generator 70. The rainfield density is varied as a function of the travel distance of projectile P by adjusting the openings of the orifices 106 in combination with the moveable control plates 102 and 104. Rainfield generator 72 has the same structure as rainfield generator 70.

In the present invention, a rainfield whose density is a prescribed function of the travel distance of the projectile is placed in the path of the projectile. The momentum exchange between the projectile and the water retards the motion of the projectile in a prescribed way resulting in the desired setback pulse for projectile speeds exceeding 1500 feet per second. Then, when the projectile attains this lower speed of 1500 feet per second, it is subjected to further desired setback by crushing a crushable mitigator, such as an aluminum honeycomb mitigator.

The field of water droplets retards the motion of the projectile because a force is exerted on it as a result of being impacted by a second mass—the water droplets. This force arises out of Newton's law for the conservation of momentum. Accordingly, the change in the speed of a moving body is governed by the mass of the body and the momentum imparted to it. The time rate of momentum transfer imparted to the water droplets and the opposing force, P, arising therefrom on the body colliding with these droplets are given by $$R = pAS(U1-U2)^2,$$

where p is the density of the rainfield, A is the area of impact (the plane of the area is assumed normal to the direction of motion of the body), U1–U2 is the body speed relative to the water droplets prior to impact, and S is a factor indicating the type of impact between the body and the droplets. S has values of 1 or 2, for inelastic or elastic impacts. The term pA(U1–U2) is the total droplet mass per unit time involved in collisions with the moving body, and the terms S(U1–U2) is the speed impacted to this mass.

Figure 3:
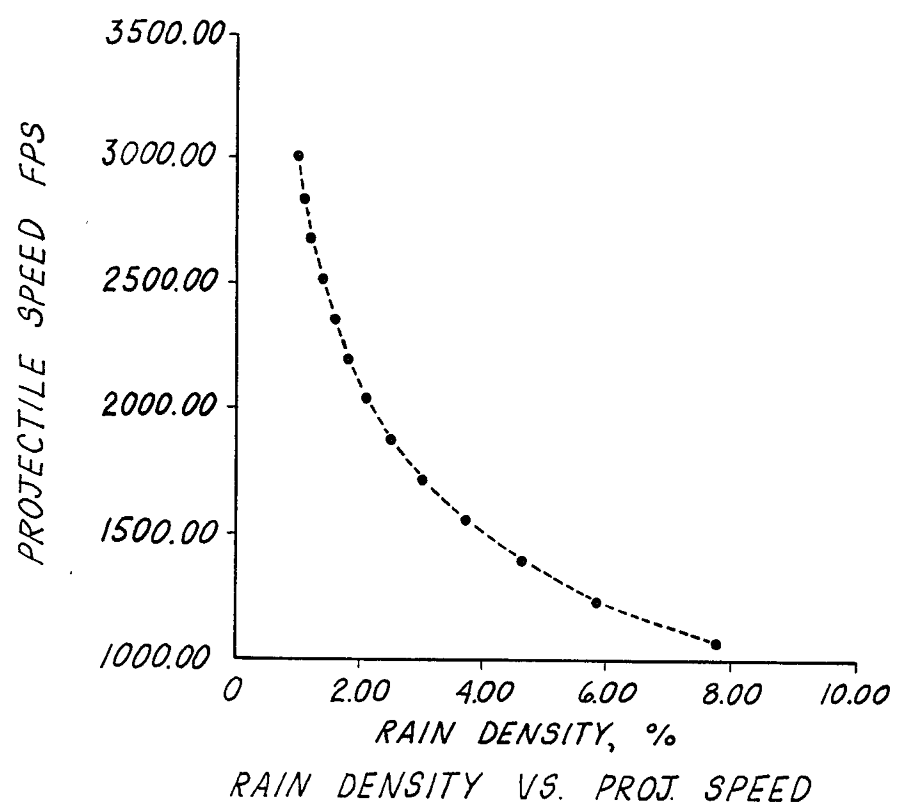
FIG. 3 is a diagram showing the relationship between rain density and projectile speed for a projectile whose diameter is 4 inches and whose weight is 3 pounds, and which is subjected to a constant deceleration of $10^4$ g.

FIG. 3 shows the rain density as a function of the projectile speed for a projectile whose diameter is 4 inches and whose weight is 3 pounds, and which is subjected to a constant deceleration of $10^4$ g. The rain density is expressed as a percentage of the density of liquid water. As shown, the rain density varies between 1 and 4 percent for projectile speeds between 3000 and 1500 feet per second. The graph of FIG. 3 is also valid for the product of projectile acceleration and weight of 30,000 g-lb; hence, the same rain density is required to provide 5000 g to a 6 pound projectile. As already noted, setback simulation is accomplished by varying the rain density as a function of the projectile travel during that part of the trajectory where the projectile speed exceeds about 1500 feet per second.

As an example, if the speed of a projectile upon exiting the air gun is 3000 feet per second, and the projectile is to be slowed to 1500 feet per second at a constant deceleration of $10^4$ g, the distance required is 10.5 feet. In the preferred embodiment, the rainfield generator produces a rain field 20 feet in length with a controlled specific weight of water varying along its length to a maximum of 2.5 lb./ft$^3$. The width of the rain field is a constant 5/12 ft. If the exit velocity from the generator is 20 ft/s, the generator delivers a maximum of 50 gal/s. Typically, a test simulation will require a maximum of 500 gallons.

The seed of the efflux through the orifices is governed by the pressure. The required pressure is approximately given by Bernoulli's momentum equation for incompressible fluids. Thus, the differential pressure at the orifices (pressure above ambient atmospheric pressure) is given by $$\tfrac{1}{2}pv^2 = 2.7 \text{ psi},$$

where p is the water density and v is the speed of the efflux. The pressure at the orifices is controlled by the throttling of the valves in each of the water supply lines.

While the invention has been described with reference to the accompanying drawings, I do not wish to be limited to the details shown therein as obvious modifications may be made by one of ordinary skill in the art.

I claim:

1. Apparatus to simulate a portion of a launch setback experienced by an ordance projectile comprising:

a. means for accelerating said projectile to a high speed;

b. a rainfield generator means to generate a density field of water droplets in a guide path of said projectile; and c. means on the rainfield generator means for varying the density of said field of water droplets as a function of the distance travelled by said projectile through said field of water droplets;

whereby the momentum exchange between said projectile and said field of water droplets retards the motion of said projectile in a prescribed way resulting in the simulation of a portion of the launch setback.

2. The apparatus of claim 1 wherein said rainfield generator means comprises:

a. a plurality of tanks;

b. a valve-controlled water supply line connected to each of said tanks; and c. a plurality of adjustable orifices in each of said tanks to allow water droplets to exit in the path of said projectile.

3. The apparatus of claim 2 wherein said rainfield generator means further comprises means for covering a portion of said orifices to thereby control the amount of water exiting from said rainfield generator means.

4. The apparatus of claim 3 wherein said means for covering a portion of said orifices comprises at least one moveable perforated plate in each of said tanks.

5. The apparatus of claim 1 wherein said means for accelerating said projectile to a high speed comprises an air gun.

6. The apparatus of claim 1 further comprising means for measuring the amount of rain generated by said rain generator means.

7. The apparatus of claim 6 wherein said means for measuring comprises a rain gauge.

8. Apparatus to simulate the entire launch setback experienced by an ordnance projectile comprising:

a. means for accelerating said projectile to a high speed;

b. a rainfield generator of a specified length to generate a density field of water droplets in the path of said projectile;

c. means for varying the density of said field of the water droplets as a function of the distance travelled by said projectile through said field of water droplets;

d. guide rails for guiding said projectile through the length of simulated setback; and e. mitigator means placed downstream from said field of water droplets and in the path of said projectile for retarding the motion of said projectile in a prescribed way; whereby the momentum exchange between said projectile and said field of water droplets retards the motion of said projectile in a prescribed way resulting in the simulation of the initial portion of the launch setback, and said mitigator means simulates the remaining portion of the launch setback.

9. The apparatus of claim 8 wherein said rainfield generator comprises:

a. a plurality of tanks;

b. a valve-controlled water supply line connected to each of said tanks; and c. a plurality of adjustable orifices in each of said tanks to allow water droplets to exit in the path of said projectile.

10. The apparatus of claim 9 wherein said rainfield generator further comprises means for covering a portion of said orifices to thereby control the amount of water exiting from said rainfield generator.

11. The apparatus of claim 10 wherein said means for covering a portion of said orifices comprises a moveable perforated plate in each of said tanks.

12. The apparatus of claim 8 wherein said means for accelerating said projectile to a high speed comprises an air gun.

13. The apparatus of claim 8 wherein said mitigator means for retarding the motion of said projectile in the prescribed way comprises:

a. a crushable mitigator; and b. a heavy member placed after said crushable mitigator.

14. The apparatus of claim 8 further comprising means for measuring the amount of rain generated by said rain generator.

15. The apparatus of claim 14 wherein said means for measuring is comprised of a series rain gauges.

16. Method to simulate the launch setback experienced by an ordnance projectile comprising the steps of:

a. accelerating said projectile to a high speed;

b. generating a density field of water droplets in a guided path of said projectile, said field being of a specified length;

c. varying the density of said field of water droplets a a function of the travel distance of said projectile;

d. guiding said projectile through the length of simulated setback; and e. retarding the motion of said projectile by mitigator means in a prescribed way after said projectile passes through said field of water droplets; whereby the momentum exchange between said projectile and said field of water droplets retards the motion of said projectile in the prescribed way resulting in the simulation of the initial portion of the launch setback, and retarding the motion of said projectile in the prescribed way to simulate the remaining portion of the launch setback.

17. The method of claim 16 further comprising the step of measuring the amount of water falling in the path of said projectile.

* * * * *